United States Patent [19]

Maruyama et al.

[11] Patent Number: 4,612,201

[45] Date of Patent: Sep. 16, 1986

[54] METHOD OF HEATING KNEADED MARINE PASTE PRODUCTS

[75] Inventors: Tutomu Maruyama, Matsudo; Norikazu Nakagawa, Funabashi; Tsuyoshi Hosokawa, Tokyo; Yuji Sakayori, Kawasaki; Shigeru Tanaka; Yoshiya Oomatsu, both of Okayama, all of Japan

[73] Assignee: Kabushiki Kaisha Kibun, Tokyo, Japan

[21] Appl. No.: 754,216

[22] Filed: Jul. 12, 1985

[51] Int. Cl.⁴ .............................................. A23L 1/325
[52] U.S. Cl. .................................... 426/511; 426/520; 426/643
[58] Field of Search ................ 426/510, 511, 643, 520

[56] References Cited

U.S. PATENT DOCUMENTS 3,663,719  5/1972  Gnaedinger ...................... 426/510

*Primary Examiner*—George Yeung

[57] ABSTRACT

By heating a kneaded marine paste product with superheated steam in a heating chamber under the conditions that:

(A) the superheated steam is blown as the heating source into the heating chamber;
(B) the paste product is prevented from being contacted directly by the superheated steam being blown in its initial blown direction into the chamber; and
(C) the temperature of the gas phase in the vicinity of the paste product is controlled at less than 100° C., to coagulate the proteins of the paste product, a paste product without adhesion thereto of water droplets can be obtained, and the drying time after the heat treatment and the energy required for drying can be greatly reduced.

6 Claims, No Drawings

METHOD OF HEATING KNEADED MARINE PASTE PRODUCTS

BACKGROUND OF THE INVENTION

This invention relates generally to kneaded marine paste products, called suisan-neri-seihin in Japan, also referred to as "surimi-based products" by the Food and Drug Administration of the U.S. Government, particularly marine paste products made from ground fish paste, called suri-mi in Japan. More particularly, this invention relates to a method of heating marine paste products to coagulate their proteins.

Marine paste products such as various fish paste products such as kamaboko and chikuwa (fish paste cakes, tubes, patties, balls, etc.) are produced by methods involving heating. Such heating may be conducted only once in some cases for the purpose of converting the raw state of fish after molding to an edible state, or twice with or without alteration of temperature, time, etc. in other cases. Also in the case of production of the so-called imitation "crab leg" kamaboko, heating is generally conducted twice. That is, the first heating is generally called the preliminary heating, which is applied to the product in the form of sheets or fibrous product cut into pieces therefrom. Then the heated product is molded into a rod-shaped product, packed in a certain amount into a bag and subjected to the second heating to be brought into an edible state.

The purpose of heating of fish paste products is to coagulate the fish meat proteins, and therefore special care is required in carrying out the heating. More specifically, in the first place, since fish paste products will foam when heated to 100° C. or higher, excessive heating must be avoided. In particular, this phenomenon is markedly observed in fish paste products in the form of sheets with engraved grooves or in fibrous fish paste products.

In addition to such care, further consideration is also necessary with respect to the point that preliminary heating of paste products is not necessarily the final step. That is to say, in some cases, paste products after preliminary heating are required to undergo post-processing steps such as application of burnt marks or molding of sheet-shaped products into rod-shaped products. In such cases, the paste products to be subjected to the post-processing steps should be free of water droplets adhering to their surfaces. (Adherence of water droplets on the surface of the product should be avoided even when the heating step is the final step without accompaniment of these post-processing steps.) However, the coagulated proteins will have low water absorbability and therefore water adhering or condensed on the surface of a paste product will inevitably exist as water droplets without being absorbed by the paste product. Accordingly, when heating is conducted by the use of conventional steam (raw vapor) as the heating source, it becomes necessary to carry out drying for a long time after heating. However, prolonged drying should be avoided, since it not only increases the probability of contamination of paste products as foods by bacteria but also prolongs unduly the time for manufacturing the paste products.

SUMMARY OF THE INVENTION

An object of the present invention is to provide a method of heating marine paste products with full consideration of the required care and the above described difficulties by a specific mode of use of superheated steam.

More specifically, the method of heating paste products according to the present invention comprises heating marine paste products in a heating chamber to coagulate the proteins of the paste products under the conditions:

(A) that superheated steam is blown as the heating source into the heating chamber;

(B) that the paste products are prevented from being contacted directly by the superheated steam being blown in its initial blown direction into the chamber; and (C) that the temperature of the gas phase in the vicinity of the paste products is controlled at less than 100° C.

According to the present invention, paste products without adherence of water droplets can be obtained, and the drying time after the heating treatment and the energy required for drying can be reduced to a great extent.

DETAILED DESCRIPTION OF THE INVENTION

Paste product

Marine paste products, as is well known in the art, comprise mainly ground fish meat and auxiliary starting materials such as binder, seasonings and others blended and kneaded therewith.

The "paste product" as herein mentioned refers primarily to a marine paste product molded into an appropriate shape, irrespective of whether it has been subjected to heating or not.

Heating device

Heating of the paste product according to the present invention is performed first in a heating chamber. Here, the "heating chamber" can be a chamber of any size or construction in which the atmosphere heated by the steam blown thereinto can be in contact with the paste product housed in the chamber for a specified time. The heating chamber may be of a completely sealed structure, but it ordinarily has an appropriate exhaust vent. An opening for charging and discharging paste products is necessary as a matter of course, and it is also desirable that a device for temperature detection or temperature control be installed within the heating chamber.

The paste product to be heated should be held in the heating chamber by an appropriate supporting means, which should desirably be such that the paste product will be movable in the heating chamber for uniformization of heating as well as for carrying the paste product into the heating chamber and carrying it out therefrom. One of such means is typically a belt conveyor. A belt conveyor may be provided either only in the heating chamber or so as to extend from outside through the heating chamber. Another example of the means for supporting paste product is the so-called turntable.

The superheated steam to be blown into such a heating chamber may be in any desired state. For suppressing introduction of moisture to a minimum, it is preferable to use superheated steam of a high degree of super heating, for example, one with a temperature of the order of 130° to 170° C.

The superheated steam must be blown into the heating chamber so that it will not directly contact the paste product in its blown direction. If the blown-in superheated steam directly contacts the paste product, the temperature of the paste product will be abruptly elevated, whereby there may arise the possibility of the temperature of the product exceeding 100° C. to cause foaming of the product. For avoiding direct contact of the superheated steam in its blown direction with the paste product, a suitable measure is to cause the steam to flow against a baffle. The baffle in this case may be one which is provided solely for that purpose, but it is convenient to devise the belt conveyor, the turntable, etc., supporting the paste product in the heating chamber so that they will perform the same function. Thus, a preferred mode of practice comprises blowing the superheated steam against the lower side of the belt conveyor.

Temperature control

Since high-temperature superheated steam is used as the heat source, in addition to exercising care as to the manner in which the steam is blown, it is also necessary to control the temperature within the heating chamber so that the temperature of the gas phase in the neighborhood of the paste product will be less than 100° C. For controlling the temperature of the gas phase at such a level, the operation is performed so as to maintain appropriately the balance between the temperature of the superheated steam to be blown into the heating chamber and the amount of exhaust gas discharged from the heating chamber. For this purpose, a suitable measure is to use a temperature detecting device arranged appropriately in the heating chamber and a device for controlling, in cooperation with the detecting device, the temperature or the rate of feeding of the superheated steam, for example, an automatic control device. Such an instrumentation is known to those skilled in the art.

EXAMPLE

An example of the method of the present invention in which it is applied to the heating of a paste product in the form of a grooved sheet is presented below.

The grooved sheet is molded by extruding a fish paste through a slit to a molding width of 190–210 mm and a thickness of 1.8–2.1 mm.

The paste product sheet with grooves thus produced is placed on a belt conveyor housed within a tunnel type heating chamber and is thus heated by superheated steam blown toward the lower side of the conveyor through a plurality of nozzles while the sheet is continuously moved within the chamber. The conditions of this operation are as follows.

Temperature in the heating chamber: 85°–99° C.
Temperature of superheated steam: 130°–170° C.
Heating time: 1 min. 40 sec.–2 min.
Time sheet left to cool: 20 sec.–40 sec.

What is claimed is:

1. A method of heating a kneaded marine paste product in a heating chamber to coagulate the proteins of said paste product, which comprises carrying out heating under the conditions of:
(A) blowing superheated steam as the heating source into the heating chamber;
(B) preventing the paste product from being contacted directly by the superheated steam being blown in its initial blown direction into the chamber; and
(c) controlling the temperature in said chamber in the vicinity of the paste product at less than 100° C.

2. A method according to claim 1, wherein the paste product is placed on a belt conveyer in the heating chamber and is thereby continually moved during the heating operation.

3. A method according to claim 2, wherein the superheated steam is blown toward the lower side of the belt conveyer.

4. A method according to claim 1 wherein the paste product is a sheet product of fibrous product with engraved grooves.

5. A method according to claim 2, wherein the paste product is a sheet product or fibrous product with engraved grooves.

6. A method according to claim 3, wherein the paste product is a sheet product or fibrous product with engraved grooves.

* * * * *